(12) United States Patent
Aten et al.

(10) Patent No.: US 7,964,274 B2
(45) Date of Patent: *Jun. 21, 2011

(54) HEAT AGED PERFLUOROPOLYMER

(75) Inventors: Ralph Munson Aten, Chadds Ford, PA (US); Heidi Elizabeth Burch, Parkersburg, WV (US); Sharon Ann Libert, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1239 days.

This patent is subject to a terminal disclaimer.

(21) Appl. No.: 11/601,363

(22) Filed: Nov. 16, 2006

(65) Prior Publication Data

US 2008/0118691 A1    May 22, 2008

(51) Int. Cl.
*B32B 5/16* (2006.01)
*B32B 1/08* (2006.01)
*C08L 27/18* (2006.01)
*C08L 27/12* (2006.01)
*C08F 259/08* (2006.01)
*C08F 214/26* (2006.01)

(52) U.S. Cl. ... 428/327; 428/36.4; 428/36.9; 428/36.92; 428/338; 428/339; 525/199; 525/200; 525/276; 525/326.2; 524/520; 524/544; 524/545; 524/546

(58) Field of Classification Search .............. 428/34.1, 428/34.8, 35.2, 35.5, 35.7, 36.4, 36.9, 36.91, 428/36.92, 323, 327, 338, 339; 525/199, 200, 276, 326.2; 524/520, 544, 545, 546

See application file for complete search history.

(56) References Cited

U.S. PATENT DOCUMENTS

| | | | |
|---|---|---|---|
| 3,142,665 A | 7/1964 | Cardinal et al. | |
| 3,819,594 A | 6/1974 | Holmes et al. | |
| 3,925,292 A * | 12/1975 | Holmes | 524/220 |
| 4,036,802 A | 7/1977 | Poirier | |
| 4,380,618 A | 4/1983 | Khan et al. | |
| 4,722,122 A | 2/1988 | Overbay | |
| 5,006,594 A | 4/1991 | Rees | |
| 5,677,404 A | 10/1997 | Blair | |
| 5,708,131 A | 1/1998 | Morgan | |
| 5,932,673 A | 8/1999 | Aten et al. | |
| 6,235,658 B1 * | 5/2001 | Panzer et al. | 442/62 |
| 6,841,594 B2 | 1/2005 | Jones et al. | |
| 6,870,020 B2 | 3/2005 | Aten et al. | |
| 7,763,680 B2 * | 7/2010 | Aten et al. | 525/199 |

FOREIGN PATENT DOCUMENTS

| | | |
|---|---|---|
| EP | 0 026 806 A1 | 10/1979 |
| EP | 1 710 276 A1 | 10/2006 |
| WO | WO 2007/061885 A2 | 5/2007 |
| WO | WO 2007/061914 A1 | 5/2007 |

* cited by examiner

*Primary Examiner* — Rena L Dye
*Assistant Examiner* — Walter B Aughenbaugh

(57) ABSTRACT

Tensile strength after heat aging of articles molded from melt-fabricable perfluoropolymer is improved by incorporating polytetrafluoroethylene as dispersed submicrometer-size particles into the melt-fabricable perfluoropolymer.

8 Claims, No Drawings

HEAT AGED PERFLUOROPOLYMER

BACKGROUND OF THE INVENTION

1. Field of the Invention

This invention relates to improving the tensile characteristics of heat aged articles molded from melt-fabricable perfluoropolymers.

2. Description of Related Art

Melt-fabricable perfluoropolymers are well known to have high melting temperatures. Tetrafluoroethylene copolymers with hexafluoropropylene, commonly referred to as FEP, have melting temperatures in the range of 250-255° C. and tetrafluoroethylene copolymers with perfluoro(alkyl vinyl ether), commonly referred to as PFA, have higher melting temperatures, e.g. at least about 270° C. and typically 300-305° C. These higher melting temperatures enable such perfluoropolymers to be used in high temperature applications. Unfortunately, in continuous service some degradation of the polymer occurs, which requires that the continuous service temperature be considerably below the melting temperature of the polymer. For example, the upper service temperature for PFA melting at about 300° C. is 260° C. The service temperature of the perfluoropolymer is typically determined by aging the perfluoropolymer in the form of a melt-fabricated article at temperature conditions simulating actual service such as 200° C., followed by room temperature testing of tensile properties. The deterioration of the tensile properties provides a measure of the ability of the article to survive continuous high temperature use similar to the aging temperature or less.

The need exists for melt-fabricable perfluoropolymer that exhibits improved heat aged, i.e. which exhibits lesser deterioration in tensile properties after heat aged.

SUMMARY OF THE INVENTION

The present invention satisfies this need in the context of the process of melt-fabricating an article from melt-fabricable perfluoropolymer and exposing said article to elevated temperature sufficient to cause deterioration of tensile strength, the improvement comprising carrying out said melt-fabricating with said melt-fabricable perfluoropolymer containing submicrometer-size particles of non-melt flowable polytetrafluoroethylene dispersed therein in an effective amount to reduce said deterioration of tensile strength. The tensile strength after the article has been exposed to heat provides is referred to herein as heat aged tensile strength. The present invention improves this heat aged property.

The present invention is especially effective with respect to sheet-like articles, i.e. articles that have a small thickness relative to length and width, examples of which are uniplanar sheets, and articles in which the sheet is formed into an annular cross-section, whereby the article becomes tubing, including pipe. This embodiment of the present invention can be described as a sheet-like article comprising melt-fabricable perfluoropolymer containing an effective amount of dispersed submicrometer-sized particles of non-melt flowable polytetrafluoroethylene to improve the heat aged tensile strength of said article.

Typically sheet-like articles are made by extrusion, and this is the preferred melt-fabrication process for use in the present invention. Extruded sheet-like articles exhibit a different tensile strength in the extrusion direction, often called the machine direction (MD), than in the direction transverse (TD) to the extrusion direction. The present invention is most effective in improving the heat aged tensile strength in the transverse direction.

It is surprising that the incorporation of dispersed non-melt flowable polytetrafluoroethylene into melt-fabricable perfluoropolymer improves heat aged tensile strength.

DETAILED DESCRIPTION OF THE INVENTION

The testing for heat aged tensile strength is carried out on the article after it has been exposed to heat for an extended period of time. The testing is done at room temperature. This exposure to heat is typically an accelerated way of simulating actual service for the article. The extended period of time for the heat aged is 7 days and the temperature to which the article is exposed for this period of time will depend on the particular perfluoropolymer as will be discussed herein.

The dispersion of the non-melt flowable polytetrafluoroethylene (PTFE) submicrometer particles into the melt-fabricable perfluoropolymer to obtain the composition that is melt-fabricated into the article providing the improved result is carried out by forming a mixture of submicrometer size particles of the PTFE and submicrometer size particles of the melt-fabricable perfluoropolymer and melt blending this mixture to form a dispersion of the PTFE particles into a continuous phase of the melt-fabricable perfluoropolymer, followed by the melt-fabrication of the dispersion either into pellets for subsequent melt-fabrication into the finished article or directly into the finished article. The submicrometer-size particles can be provided by the polymers being associated together as core/shell polymer particles, wherein the PTFE is the core and the melt-fabricable perfluoropolymer is the shell, or by separately supplied submicrometer-size particles of each polymer or by a combination thereof. Details of the polymers and their provision as submicron-size particles are discussed herein.

With respect to the PTFE component, the non-melt flowability of the PTFE can also be characterized by high melt creep viscosity, sometimes called specific melt viscosity, which involves the measurement of the rate of elongation of a molten sliver of PTFE under a known tensile stress for 30 min, as further described in and determined in accordance with U.S. Pat. No. 6,841,594, referring to the specific melt viscosity measurement procedure of U.S. Pat. No. 3,819,594. In this test, the molten sliver made in accordance with the test procedure is maintained under load for 30 min, before the measurement of melt creep viscosity is begun, and this measurement is then made during the next 30 minutes of applied load. The PTFE preferably has a melt creep viscosity of at least about $1\times10^6$ Pa·s, more preferably at least about $1\times10^7$ Pa·s, and most preferably at least about $1\times10^8$ Pa·s, all at 380° C. This temperature is well above the first and second melt temperatures of PTFE of about 343° C. and 327° C., respectively. The high melt creep viscosity of the PTFE present in the core of the core/shell polymer also means that the PTFE is sinterable, i.e. a molded article, unsupported by the mold (free-standing), of the PTFE can be heated above the melting point of the PTFE to coalesce the PTFE particles without the molded article flowing to lose its shape. The PTFE used in the present invention is also often characterized by standard specific gravity (SSG), which is the ratio of weight in air of a PTFE specimen prepared in a specified manner to an equal volume of water at 23° C. as further described in U.S. Pat. No. 4,036,802 and ASTM D 4894-94. The lower the SSG, the higher the molecular weight of the PTFE. The specimen preparation procedure as disclosed in ASTM D-4894-94 includes compression molding the test specimen, removing the compression molded test specimen from the mold, and sintering the specimen in air, i.e. free standing, at 380° C. The non-melt flowability of the PTFE enables this sintering to be carried out without the test specimen losing its compression molded shape and dimensions.

The PTFE can be the granular type or the fine powder type, made by suspension or aqueous dispersion polymerization, respectively. The PTFE can be homopolymer of tetrafluoroethylene or a copolymer thereof with a small amount of comonomer, such as hexafluoropropylene or perfluoro(alkyl vinyl ether), preferably wherein the alkyl group contains 1 to 5 carbon atoms, that improves the sinterability of the TFE, to obtain such improvement as reduced permeability and greater flex life, as compared to the TFE homopolymer. This type of PTFE is sometimes referred to as modified PTFE. Examples of modified PTFE are disclosed in U.S. Pat. Nos. 3,142,665, 3,819,594, and 6,870,020. For simplicity and because the modified PTFE exhibits the same non-melt flow, high melt creep viscosity of PTFE homopolymer, this type of PTFE is included in the term polytetrafluoroethylene or PTFE used herein.

The non-melt flowable PTFE used in the present invention is to be distinguished from low molecular weight PTFE, which because of its low molecular weight has melt flowability but not melt-fabricability. This melt flowable PTFE, which has an MFR that is measurable by ASTM D 1238-94a, is obtained by direct polymerization under conditions that prevent very long polymer chains from forming, or by irradiation degradation of non-melt flowable PTFE. Such melt flowable PTFE is commonly called PTFE micropowder. It is not considered as being melt fabricable because the article molded from the melt is useless, by virtue of extreme brittleness. Because of its low molecular weight (relative to non-melt-flowable PTFE), it has no strength. An extruded filament of the PTFE micropowder is so brittle that it breaks upon flexing.

With respect to the melt-fabricable perfluoropolymer component of the composition of the present invention, as indicated by the prefix "per" in perfluoropolymer, the monovalent atoms bonded to the carbon atoms making up the polymer are all fluorine atoms. Other atoms may be present in the polymer end groups, i.e. the groups that terminate the polymer chain. The perfluoropolymer is a perfluoroplastic, not a perfluoroelastomer.

While the PTFE component of the composition is non-melt flowable, the melt-fabricable perfluoropolymer is melt flowable as indicated by it being melt-fabricable. The melt flowability of the perfluoropolymers used in the present invention can vary widely, depending on the proportion of PTFE, the melt-fabrication technique desired for the PTFE/melt-fabricable perfluoropolymer composition and the properties desired in the melt-fabricated article. Thus, melt flowability, expressed as MFR below, for the melt-fabricable perfluoropolymer can be in the range of about 0.1 to 500 g/10 min, but will usually be preferred as about 0.5 to 100 g/10 min, and more preferably 0.5 to 50 g/10 min, as measured according to ASTM D-1238-94a and following the detailed conditions disclosed in U.S. Pat. No. 4,952,630, at the temperature which is standard for the resin (see for example ASTM D 2116-91 a and ASTM D 3307-93 that are applicable to the most common melt-fabricable perfluoropolymers, both specifying 372° C. as the resin melt temperature in the Plastometer®). The amount of polymer extruded from the Plastometer® in a measured amount of time is reported in units of g/10 min in accordance with Table 2 of ASTM D 1238-94a and is described herein as MFR (melt flow rate). If the perfluoropolymer is present as the shell of core/shell polymer, the MFR of the perfluoropolymer in the shell is determined by carrying out the polymerization of the perfluoromonomers used to form the perfluoropolymer by themselves, i.e. no core, using the same recipe and polymerization conditions used to form the shell, to obtain perfluoropolymer that can be used in the MFR determination.

The difference between non-melt flowability of the PTFE core and the melt flowability of the melt-fabricable perfluoropolymer shell is apparent from the melt flow rate (MFR) test procedure of ASTM D 1238-94a. The PTFE used in the present invention has no melt flow (zero MFR). Conversely, the melt creep viscosity of the melt-fabricable perfluoropolymer cannot be measured, because at the 380° C. temperature of the test, the sliver flows, leading to rupture of the sliver, whereby its creep under load at 380° C. cannot be determined.

Even though the PTFE component exhibits an MFR of 0 g/10 min at 372° C., the melt flowability of the melt-fabricable perfluoropolymer imparts melt flowability and thus melt-fabricability to the composition. The composition exhibits thixotropy (shear thinning) whether the submicrometer-size particles are core/shell polymer or separately supplied PTFE and perfluoropolymer components, or a combination thereof, i.e. the composition becomes increasingly flowable (higher MFR) as the shear rate applied to the molten composition increases. The shear used in the melt blending associated with melt extrusion thus increases melt flowability of the composition, enabling it to be melt fabricated. This shear thinning of the composition is greater than for the melt-fabricable perfluoropolymer by itself.

Examples of melt-fabricable perfluoropolymers that can be used in the shell of the polymer of the core/shell polymer or as separately supplied polymer include the copolymers of tetrafluoroethylene (TFE) with one or more polymerizable perfluorinated comonomers, such as perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers include perfluoro(methyl vinyl ether) (PMVE), perfluoro(ethyl vinyl ether) (PEVE), perfluoro(propyl vinyl ether) (PPVE), and perfluoro(butyl vinyl ether) (PBVE). The copolymer can be made using several PAVE monomers, such as the TFE/perfluoro(methyl vinyl ether)/perfluoro(propyl vinyl ether) copolymer, sometimes called MFA by the manufacturer. The preferred perfluoropolymers are TFE/HFP copolymer in which the HFP content is about 5-17 wt %, more preferably TFE/HFP/PAVE such as PEVE or PPVE, wherein the HFP content is about 5-17 wt % and the PAVE content, preferably PEVE, is about 0.2 to 4 wt %, the balance being TFE, to total 100 wt % for the copolymer. The TFE/HFP copolymers, whether or not a third comonomer is present, are commonly known as FEP. TFE/PAVE copolymers, generally known as PFA, have at least about 2 wt % PAVE, including when the PAVE is PPVE or PEVE, and will typically contain about 2-15 wt % PAVE. When PAVE includes PMVE, the composition is about 0.5-13 wt % perfluoro(methyl vinyl ether) and about 0.5 to 3 wt % PPVE, the remainder to total 100 wt % being TFE, and as stated above, may be referred to as MFA.

The perfluoropolymer comonomer content of core/shell polymer and of the melt-fabricable perfluoropolymer by itself is determined by infrared analysis on compression molded film made from the polymer in accordance with the procedures disclosed in U.S. Pat. No. 4,380,618 for the particular fluoromonomers (HFP and PPVE) disclosed therein. The analysis procedure for other fluoromonomers is disclosed in the literature on polymers containing such other fluoromonomers. For example, the infrared analysis for PEVE is disclosed in U.S. Pat. No. 5,677,404. The perfluoropolymer shell composition is made to have a composition that is predictable from copolymerization to make the perfluoropolymer by itself. The perfluoropolymer composition of the core/shell polymer used in the present invention, however, is determined on the entire core/shell polymer. The composition of the shell is calculated by subtracting the weight of the TFE consumed to make the PTFE core. The perfluoromonomer content other than TFE of the core/shell polymer is preferably at least 1.5 wt % based on the total weight of the TFE and perfluoromonomer in the core/shell polymer, but present in the shell. The perfluoropolymer content of the melt-mixed composition when the perfluoropolymer is separately supplied to the composition, i.e. not as core/shell polymer, is the weight % of the perfluoropolymer component used to form the melt mixed composition, based on the combined weights of the PTFE and perfluoropolymer components used to form the composition.

The preferred composition used in the present invention comprises about 4 to 40 wt % PTFE based on the combined weight of the PTFE and melt-fabricable perfluoropolymer components. Maximum amounts of PTFE of 30 wt %, 20 wt % and 10 wt % are also applicable to the minimum content of about 4 wt %.

The heat aged temperature used to determine improved tensile strength, will depend on the melting temperature of the melt-fabricable perfluoropolymer. Typically such temperature for PFA will be 200° C., while for FEP, will be 150° C. For perfluoropolymers in general, the heat aged temperature will be at least about 140° C. For particular polymers, however, it is preferred that a temperature for the seven-day heating exposure be a temperature at which the tensile strength upon cooling of the heat aged article to room temperature shows deterioration. Under this same heating condition, the present invention shows improvement in tensile strength. Instead of deterioration, the tensile strength may even be greater than obtained for the same article aged at room temperature for seven days. In any event, it is preferred that the tensile strength obtained by practice of the present invention is at least 5% greater than the tensile strength obtained from the melt-fabricable perfluoropolymer article by itself, more preferably at least 10% greater. The improvement obtained by the present invention is especially great when the melt fabrication method is extrusion of the sheet-like article, wherein the tensile strength of the sheet-like article is different in the MD as compared to the TD. The improvement obtained by the present invention is generally most pronounced as extrusion rate is speeded up to obtain increased productivity and in the TD.

As described above, the sheet-like articles, which are the preferred articles melt-fabricated for achieving improved heat aged tensile strength, are thin relative to other dimensions of the article. Preferably, the thickness of the article is less than ⅕ that of the width dimension of the article, which in the case of the article having an annular cross-section would be the circumference of the article, and more preferably, less than 1/10 thereof. Generally, the thickness of the article will be no greater than about 8 mm. The thickness dimension is even a smaller fraction of the length of the article, especially when the article is made by extrusion. When the sheet-like article has an annular cross-section, i.e. ring-like, the cross-section can be circular or other annular shape, such as oval.

The core/shell polymer useful in the present invention can be made by aqueous dispersion polymerization. In one embodiment, the non-melt flowable PTFE core is prepared in a polymerization that is separate from the polymerization forming the shell melt-fabricable perfluoropolymer, and this core is used to seed the polymerization of the perfluoromonomer forming the melt-fabricable perfluoropolymer shell onto the core. In another embodiment, the core is formed in situ, followed by the polymerization to form the shell on the core. In this embodiment, the non-melt flowable PTFE core is formed by polymerization of TFE. Then the TFE (and initiator) feed to the polymerization reactor is stopped. The polymerization reaction is allowed to complete itself, and the transition to the copolymerization to form the shell polymer will depend on the copolymerization system being used. For example, the TFE remaining in the reactor can be permitted either to be consumed by the PTFE polymerization or to be vented off, and in either case, the copolymerization system for the shell polymer is then established. Alternatively, the copolymerization system for the shell polymer is established while maintaining the TFE concentration in the reactor constant. Then the copolymerization to form the shell is started. Addition of the comonomer along with additional TFE to the reactor will depend on the comonomer. When the comonomer is HFP, the total amount will typically be added at the commencement of the copolymerization reaction. When the comonomer is PAVE, it too may be added at the commencement of the copolymerization reaction or co-fed to the reactor with the TFE feed to the copolymerization reaction. Agitation of the aqueous medium and initiator addition may be stopped when the initial charge of comonomer is fed to the reactor to avoid premature coagulation of the PTFE core. The copolymerization to form the shell is carried out to obtain the relative amount of shell polymer desired and particle size of the core/shell polymer.

The core/shell polymer is preferably formed by first forming the core in situ, followed by the copolymerization to form the shell. This provides a better integration of the shell with the core, by chemical bonding between the core and the shell, wherein the shell copolymer acts as a compatibilizing agent with other melt-fabricable perfluoropolymer (from other core/shell polymer particles or from independently supplied melt-fabricable perfluoropolymer). Upon melt blending such as occurs during extrusion, the melt-fabricable perfluoropolymer becomes the matrix of the blend composition and the submicrometer-size PTFE particles, whether supplied by the core of core/shell polymer or from separately supplied particles, become dispersed in the perfluoropolymer matrix. That the PTFE particles form the dispersed phase is confirmed by the melt blend being melt fabricable, not withstanding the non-melt flowability of the PTFE and by the transparent to translucent appearance of articles molded from the blend as compared to the opaque appearance of articles molded from PTFE by itself.

The polymerization to form the non-melt flowable PTFE core, whether by seed polymerization, by suspension or aqueous dispersion polymerization or in situ is conventional polymerization to form the non-melt flowable PTFE. The polymerization to form the shell or separately created particles of melt-fabricable perfluoropolymer is also conventional aqueous dispersion polymerization. Examples of initiators used in both polymerizations include ammonium persulfate, potassium persulfate, bis(perfluoroalkane carboxylic acid) peroxide, azo compounds, permanganate oxalic acid system, and disuccinic acid peroxide. Examples of dispersing agents used in the aqueous dispersion polymerizations include ammonium perfluorooctanoic and perfluoroalkyl ethane sulfonic acid salts, such as the ammonium salt.

A typical aqueous dispersion polymerization process as known in the art involves the steps of precharging an aqueous medium to a stirred autoclave, deoxygenating, pressurizing with TFE to a predetermined level, adding modifying comonomer if desired, agitating, bringing the system to desired temperature, e.g., 60°-100° C., introducing initiator, adding more TFE according to predetermined basis, and regulating temperature. Initiator addition, at the same or different rate, may continue throughout the batch or only for part of the batch. Recipe and operating parameters not fixed by the equipment are commonly selected in order that temperature is maintained approximately constant throughout the polymerization. This same general procedure is followed for polymerizing the perfluoromonomers to make the melt-fabricable perfluoropolymer, except that the polymerization temperature and order of addition of the TFE and the other perfluoromonomer will depend on the identity of the additional perfluoromonomer. Examples of general procedures for making melt-fabricable perfluoropolymer are disclosed in U.S. Pat. No. 5,677,404 (FEP) and U.S. Pat. No. 5,932,673 (PFA). The transition between the polymerization to make the core and the polymerization to make the shell can be varied. The timing of the transition is set in order to obtain the weight proportion of PTFE core desired in the core/shell polymer. The weight % core can be determined by comparing the weight of TFE consumed in the polymerization of the core with the weight of perfluoromonomers, e.g. TFE plus HFP or perfluoro(alkyl vinyl ether) consumed in the polymerization of the shell.

When core/shell polymer is used, this can provide the PTFE and melt-fabricable perfluoropolymer components to the composition to be melt blended. Alternatively, these components can be supplied by separate aqueous dispersion polymerizations followed by combining these dispersions to obtain a mixture of the polymer particles in the resultant aqueous medium. In the case of the aqueous dispersion of core/shell polymer, a separate aqueous dispersion of either PTFE or melt-fabricable perfluoropolymer can be mixed with the core/shell dispersion to obtain the composition desired.

The particle size of the core/shell polymer, or separately polymerized PTFE or melt-fabricable perfluoropolymer, as the case may be, is small enough that the polymer particles remain dispersed in the aqueous medium until the polymerization reaction is completed, whereupon the dispersed core/shell polymer particles can be intentionally coagulated, by such conventional means as increased agitation from the agitation applied during polymerization or by addition of electrolyte. Alternatively, the coagulation can be done by freeze/thaw method such as disclosed in U.S. Pat. No. 5,708,131 (Morgan).

Typically, the average as-polymerized polymer particle size (diameter), referred to as RDPS (raw dispersion particle size) in the Examples, will be less than one micrometer (submicrometer-size) as determined by the laser light scattering method of ASTM D 4464. Preferably the average polymer particle size is less than about 0.5 micrometer, more preferably less than about 0.3 micrometer, and even more preferably, less than about 0.25 micrometer and most preferably less than about 0.2 micrometer. These particle sizes apply to the particles of PTFE, melt-fabricable perfluoropolymer, and to the core/shell polymer used to form the composition of the present invention. The smaller the average core/shell polymer particle size, the more stable the aqueous dispersion of the polymer particles, enabling the polymerization to be carried out to higher polymer solids content before stopping the polymerization and carrying out coagulation. The average particle size of the core of the core/shell polymer will vary with overall size of the core/shell polymer and the weight proportion of the core desired and will in any event, be smaller than the particle size of the core/shell polymer particles. Thus, since the core/shell polymer particles are on average submicrometer-size, so will the core particles be submicrometer-size when the core/shell polymer particles are melt-mixed to form the continuous phase of melt-fabricable perfluoropolymer with the core PTFE particles dispersed therein. Similarly, for each of the core/shell polymer average particle sizes cited above, the core particles will be smaller. Thus, for the average core/shell polymer particle size of less than about 0.3 micrometer, the average particle size of the core therein will also be less than about 0.3 micrometers. The particle size of the core in the core/shell polymer incorporated into the melt blend is understood to be the size of the particles of PTFE in the melt blend and articles melt-fabricated from the melt blend, because of the non-melt flowability of the PTFE.

The as-polymerized core/shell polymer particle sizes described above are the primary particles (sizes) of the polymer. Coagulation of the aqueous dispersion of the core/shell primary particles and co-coagulation of the mixed together separately prepared aqueous dispersions of PTFE particles and particles of melt-fabricable perfluoropolymer causes these particles to agglomerate together, and upon drying to become a fine powder having an average particle size depending on the method of coagulation, but of at least about 300 micrometers, as determined by the dry-sieve analysis disclosed in U.S. Pat. No. 4,722,122. The agglomerates of primary particles and thus the particles of the fine powder are often referred as secondary particles.

Thus, the core/shell polymer particles or the separately supplied PTFE and melt-fabricable perfluoropolymer components used in the present invention can be provided in several forms, as primary particles and as secondary particles. When these particles are melt-mixed (blended), the core/shell polymer and the melt-fabricable perfluoropolymer component, as the case may be, loses its particulate form to become a blend of the two polymers, wherein the core or PTFE primary particle becomes the dispersed phase and the melt-fabricable perfluoropolymer becomes the continuous phase. The melt mixing can be part of the melt fabrication process, such as occurs during extrusion. Typically, the melt blend will be extruded as molding pellets, which can later be used for melt fabrication into the final article. The dispersion/continuous phase structure of the melt-mixed pellets is carried over into the melt fabricated finished product. The melt blending or melt fabrication process which includes melt mixing is typically carried out at a temperature above the melting temperature of the polytetrafluoroethylene, which is about 343° C. for the first melt and about 327° C. for subsequent melts and which is above the melting temperature of the melt-fabricable perfluoropolymer. Thus, the melt mixing temperature will typically be at least about 350° C.

EXAMPLES

The polymers used in this Example are as follows:
PFA 1 used in this Example is a copolymer of tetrafluoroethylene (TFE) and perfluoro(propyl vinyl ether) (PPVE), with PPVE content of 4.1 wt %, and MFR of 29.2 g/10 min.
PFA 2 used in this Example is the same copolymer as PFA 1 except that the PPVE content of 4.2 wt %, and the MFR is 12.6 g/10 min.
State 1 is a core/shell polymer having 4.78 wt % polytetrafluoroethylene core and a PFA shell of composition like that of PFA 1. State 1 MFR is 8 g/10 min.
State 2 is a core/shell polymer having 4.81 wt % polytetrafluoroethylene (PTFE) core and a PFA shell of composition like that of PFA 2. State 2 has an MFR of 4 g/10 min.
The state 1 core/shell polymer was made by the following polymerization procedure. A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water, 5 g Krytox® 157FSL, and 240 mL of a 20 wt % solution of ammonium perfluorooctanoate surfactant in water. With the reactor paddle agitated at 50 rpm, the reactor was evacuated and purged three times with tetrafluoroethylene (TFE). The reactor temperature then was increased to 75° C. After the temperature had become steady at 75° C., the pressure of the reactor was raised to 300 psig (2.1 MPa) using TFE. Four hundred milliliters of an initiating solution consisting of 0.2 wt % ammonium persulfate in water was injected to the reactor, then this same initiator was added at 5.0 mL/min. After polymerization had begun as indicated by a 10 psig (0.07 MPa) drop in reactor pressure, additional TFE was added at 0.2 lb (90.8 g)/min for 5 min. After 1 lb (454 g) of TFE was fed after initiation, the TFE and initiator feeds were stopped, then the reactor was slowly vented. After stopping agitation, the reactor vapor space was evacuated. Agitation was resumed at 50 rpm, then the contents were cooled to 25° C. The agitator was again stopped, then the pressure in the reactor was raised to 8 in Hg (3.93 psig, 2.71×10$^{-2}$ MPa) with ethane. After the addition of ethane, the agitator was restarted at 50 rpm and the contents of the reactor were warmed to 80° C. A 200 mL aliquot of perfluoro(propyl vinyl ether) (PPVE) was added, then the pressure in the reactor was raised to 250 psig (1.75 MPa) with TFE. For the duration of the reaction, PPVE was added at 2 mL/min and initiation was resumed using the same solution at a rate of 5 mL/min. The pressure of TFE in the reactor was continuously adjusted to maintain a reaction rate of 0.167 lb TFE/min (75.7 g/min). After 16 lbs (8618 g) TFE reacted in 96 min, the reaction was terminated by stopping TFE, initiator, and PPVE feeds, then venting the reactor. The state 2 polymer was prepared the same way except that the warming after ethane addition was to 75° C. instead of 80° C.

The elongation at break and tensile strength reported in this Example for extruded tubing were obtained by the procedure of ASTM D 1708-06 on microtensile test specimens die cut from tubing samples in the machine direction and the transverse direction, modified by use of specimens having the following dimensions:

| | |
|---|---|
| Length: | 20.638 mm |
| Thickness: | 0.559 mm |
| Width test section: | 4.000 mm |
| Width grip section: | 15.875 mm |
| Length grip section: | 0.219 mm |

Polymers were extruded into tubing of 10 mm outer diameter, having a nominal wall thickness of 0.584 mm. The extruder was a Davis Standard extruder, Model DS-15H, with a 38.1 mm diameter, general purpose screw featuring a L/D ratio of 24:1 and a compression ratio of 3:1. Temperature profile: rear 332° C., Center 340° C.; Front 349° C.; Die Body 349° C. Melt cone exit the die was 28.575 mm. Extrusion rates were 10 rpm with a line speed of 1.8 m/min and 20 rpm with a line speed of 3.7 m/min.

Polymer was extruded into tubing as described above. After aging for seven days at room temperature (RT) or at 200° C. in an air oven, tensile strength and elongation were measured in the machine (MD) and in the transverse (TD) directions. Table 1 summarizes the results for tubing extruded at a screw speed of 10 rpm and a line speed of 1.83 m/min.

TABLE 1

| Polymer | PFA-1 | State 1 | PFA-2 | State 2 |
|---|---|---|---|---|
| MFR, g/10 min | 29.2 | 8 | 12.6 | 4 |
| Aged at RT | | | | |
| Tensile MD, psi | 1943 | 2691 | 2936 | 2596 |
| Tensile TD, psi | 1935 | 2574 | 2483 | 2793 |
| Elongation MD, % | 281 | 277 | 280 | 264 |
| Elongation TD, % | 245 | 276 | 220 | 270 |
| Aged at 200° C. | | | | |
| Tensile MD, psi | 1345 | 1929 | 2453 | 2521 |
| Tensile TD, psi | 1737 | 1700 | 1938 | 2517 |
| Elongation MD, % | 198 | 260 | 282 | 234 |
| Elongation TD, % | 264 | 239 | 212 | 267 |

Table 2 summarizes the results for tubing extruded at a screw speed of 20 rpm and a line speed of 3.66 m/min.

TABLE 2

| Polymer | PFA-1 | State 1 | PFA-2 | State 2 |
|---|---|---|---|---|
| MFR, g/10 min | 29.2 | 8 | 12.6 | 4 |
| Aged at RT | | | | |
| Tensile MD, psi | 2488 | 2223 | 2759 | 2768 |
| Tensile TD, psi | 2600 | 2534 | 2702 | 2601 |
| Elongation MD, % | 254 | 280 | 291 | 256 |
| Elongation TD, % | 256 | 297 | 256 | 266 |
| Aged at 200° C. | | | | |
| Tensile MD, psi | 1650 | 2649 | 2220 | 2965 |
| Tensile TD, psi | 1594 | 2274 | 2331 | 2745 |
| Elongation MD, % | 255 | 275 | 277 | 266 |
| Elongation TD, % | 231 | 264 | 267 | 248 |

The tubing extruded from state 1 and state 2 compositions exhibits equivalent physical properties in general when extruded at slow rates and when tested at room temperature. The tubing exhibits improved physical properties when tested after aging at 200° C., especially when tested in the TD (transverse direction). The tubing extruded from state 1 and state 2 compositions exhibits improved physical properties in general when extrusion is carried out at fast rates. This improvement becomes more pronounced when tested after aging at 200° C. and especially when tested in the transverse direction.

The invention claimed is:

1. Sheet-like article comprising melt-fabricable perfluoropolymer containing about 4 to about 40 wt % of dispersed submicrometer-sized particles of non-melt flowable polytetrafluoroethylene based on the combined weights of said melt-fabricable perfluoropolymer and non-melt flowable polytetrafluoroethylene to improve the heat aged tensile strength of said article.

2. The sheet-like article of claim 1 wherein said article is made by extrusion, whereby said article has different tensile strengths in the direction of said extrusion and in the direction transverse to said extrusion, and said improvement in said heat aged tensile strength is at least improvement in tensile strength in said transverse direction.

3. The sheet-like article of claim 2 as a uniplanar sheet.

4. The sheet-like article of claim 2 having an annular cross-section.

5. The sheet-like article of claim 4 as tubing.

6. The sheet-like article of claim 1 wherein the amount of dispersed submicrometer-sized particles of non-melt flowable polytetrafluoroethylene is about 4 wt % to about 10 wt %.

7. The sheet-like article of claim 1 wherein said amount of dispersed submicrometer-sized particles of non-melt flowable polytetrafluoroethylene is about 4 wt % to about 20 wt %.

8. The sheet-like article of claim 1 wherein the amount of dispersed submicrometer-sized particles of non-melt flowable polytetrafluoroethylene is about 4 wt % to about 30 wt %.

* * * * *